July 28, 1959      C. R. BELTZ      2,896,887
CLIP
Filed May 6, 1957
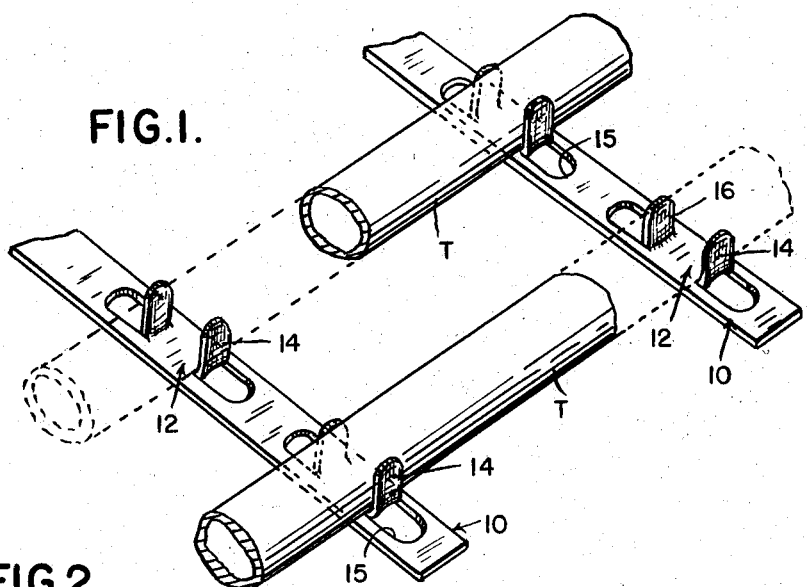
FIG.1.
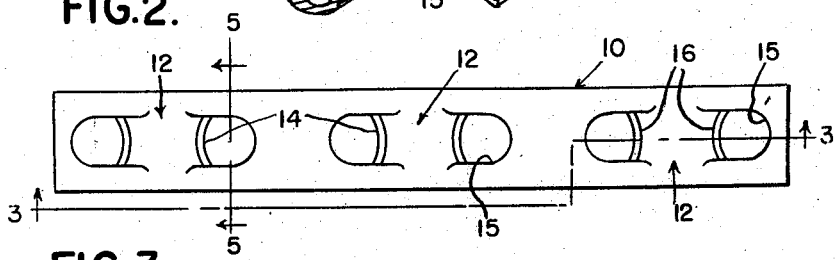
FIG.2.
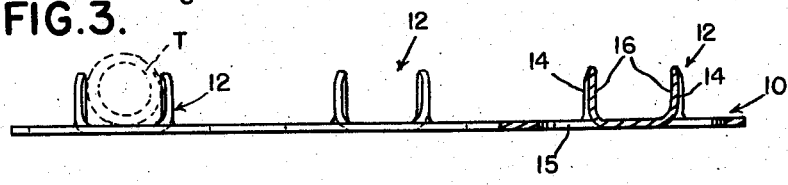
FIG.3.
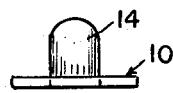      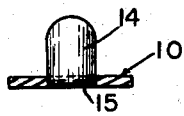
FIG.4.      FIG.5.
INVENTOR.
CHARLES R. BELTZ
BY
*Whittemore, Hulbert & Belknap*
ATTORNEYS

United States Patent Office 2,896,887
Patented July 28, 1959

2,896,887

CLIP

Charles R. Beltz, Grosse Pointe, Mich.

Application May 6, 1957, Serial No. 657,350

3 Claims. (Cl. 248—68)

This invention relates to retaining devices and refers more particularly to a clip for holding a member against movement.

One object of this invention is to provide a clip for retaining a member, such as a flexible tube, which is simple in construction, inexpensive to manufacture and highly effective in the performance of its intended function.

Another object of the invention is to provide a device having a plurality of clips for retaining the flexible tubes or like members in a predetermined relationship to each other.

Still another object of the invention is to provide a plate for supporting the flexible tubes or like members having a plurality of clips struck from the material of the plate and adapted to frictionally retain the members in predetermined relation to each other on the plate.

Other objects and features of the invention will become apparent as the description proceeds, especially when taken in conjunction with the accompanying drawing illustrating a preferred embodiment of the invention, wherein:

Fig. 1 is a perspective view illustrating structure embodying the invention.

Fig. 2 is a top plan view of one of the clip plates shown in Fig. 1.

Fig. 3 is a side elevational view, partly in section, of the clip plate shown in Fig. 2, taken along the line 3—3 on Fig. 2.

Fig. 4 is an end elevational view.

Fig. 5 is a sectional view taken along the line 5—5 on Fig. 2.

Referring now more particularly to the drawing, a pair of clip plates 10 are shown in Fig. 1. These plates are of identical construction and are adapted to support tubes T. The tubes T are formed of a flexible, yieldable and resilient material such as rubber or plastic. However, it will be understood that the clip plates 10 may be employed for supporting tubes having rigid unyielding walls or for that matter many other types of members other than tubing. In general however the members will be elongated and have a generally cylindrical outer surface.

Each clip plate has a plurality of clips 12 located in spaced relation along the length of the plate. Each clip comprises a pair of spaced legs 14 which are struck out from the material of the plate and turned toward each other to extend laterally outwardly from the upper side of the plate in spaced relation to each other. The struck out legs leave holes 15 in the plate. The portion of the plate between the legs of each clip is in effect the base of the clip and cooperates with the legs thereof to define a clip of generally U-shaped configuration. The legs of each clip are identical although turned in opposite directions, and are midway between the parallel opposite sides of the plate.

The inner gripping surface 16 of each leg is convexly curved in all planes parallel to the plate from the free end of the leg to its point of connection with the plate. The surfaces 16 of the legs of each clip are symmetrical with respect to a plane through the legs perpendicular to the plate and midway between the side edges of the legs.

All longitudinal elements of the surface 16 of each leg are substantially straight from the free end of the surface to a point about two-thirds of the distance to the base of the clip. These elements 16 lie in planes extending perpendicular to and lengthwise of the plate 10. The remaining portions of the longitudinal elements are concave and curve smoothly into the inner or top surface of the base of the slip. The straight portions of the longitudinal elements terminate at the upper or free ends of the legs in a rounded edge to permit the tubes to be inserted between the legs without damage. The straight portions of the longitudinal elements extend approximately perpendicular to the base, or if anything diverge very slightly toward the tips of the legs.

The tubes T are simply pressed into position between the legs of the clips and are supported on the plates 10 by the bases of the clips. The tubes are frictionally held between the opposed gripping surfaces 16 of the legs. Relatively small diameter tubes will be gripped by only a portion of the surfaces 16 and particularly by the central longitudinal elements. Tubes slightly larger in diameter will engage greater widths of the surfaces 16 to afford a stronger gripping action.

While the clip plates described above are particularly suited for supporting and frictionally retaining flexible tubing such as may be used for refrigeration purposes for example, and while the clip plates have been found to be highly successful in this connection, their field of use is not limited to flexible tubing but may be employed in connection with rigid wall tubing or many other members having a shape which will accommodate itself to the configuration of the clips.

The plates 10 and hence the legs 12 are preferably of a resilient material such as metal or plastic. Thus the legs will yield slightly to frictionally and resiliently grip a member, whether or not the member itself is yieldable.

What I claim as my invention is:

1. A clip adapted to laterally support a member such as a flexible tube or the like, said clip having a base and legs extending from one side of said base in spaced opposed relation to each other to grip opposite sides of the member and frictionally retain it on said base, the opposed member gripping surfaces of said legs being convex in a direction transversely of said legs for substantially the entire length of said legs.

2. A clip adapted to laterally support a member such as a flexible tube or the like, said clip having a base and legs extending from one side of said base at approximately right angles thereto in spaced opposed relation to each other to grip opposite sides of the member and frictionally retain it on said base, the opposed member gripping surfaces of said legs having longitudinal elements which are substantially straight and perpendicular to the base for substantially the entire length thereof and which terminate at the free ends of the legs in rounded portions curving away from each other, said opposed surfaces being convex in a direction transversely of said legs for substantially the entire length of said legs.

3. A device for laterally supporting a plurality of members such as flexible tubes or the like in a predetermined spaced relation comprising a plate having a plurality of spaced pairs of legs struck out from said plate with the legs of each pair turned toward each other to extend laterally outwardly from one side of said plate in spaced opposed relation to each other, the portion of said plate between each pair of legs cooperating with said legs to define a generally U-shaped clip the legs of which are adapted to frictionally engage the opposite sides of the member and retain it on said base, the opposed member gripping surfaces of the legs of each pair having portions concave in a direction lengthwise of said legs which connect into the innner surface of said base and having portions extending in continuation of said concave portions for substantially the entire length of said legs the longitudinal elements of which are substantially straight and perpendicular to the plate and which terminate at the free ends of said legs in rounded portions curving away from each other, said first and second mentioned portions of said opposed surfaces being convex in a direction transversely of said legs for substantially the entire length of said legs.

References Cited in the file of this patent

UNITED STATES PATENTS

| | | |
|---|---|---|
| 1,571,000 | Eustis | Jan. 26, 1926 |
| 2,525,398 | Collins | Oct. 10, 1950 |

FOREIGN PATENTS

| | | |
|---|---|---|
| 66,086 | Norway | Apr. 12, 1943 |